(12) United States Patent
Hermann (10) Patent No.: US 7,818,847 B1
(45) Date of Patent: Oct. 26, 2010

(54) ATTACHMENT BRACE FOR SUPPORTING A USER'S ARMS WHEN TRANSPORTING AN OBJECT AND ASSOCIATED METHOD

(76) Inventor: Jim Hermann, P.O. Box 422, Lebanon, NJ (US) 08833

( * ) Notice: Subject to any disclaimer, the term of this patent is extended or adjusted under 35 U.S.C. 154(b) by 421 days.

(21) Appl. No.: 12/150,266

(22) Filed: Apr. 28, 2008

Related U.S. Application Data (63) Continuation-in-part of application No. 12/009,385, filed on Jan. 22, 2008.

(60) Provisional application No. 60/804,007, filed on Jun. 6, 2006.

(51) Int. Cl.
*B25G 1/10* (2006.01)

(52) U.S. Cl. .................. 16/430; 16/426; 16/110.1; 16/440

(58) Field of Classification Search ............ 16/426, 16/427, 430, 110.1, 422, 112.1, 113, 434, 16/373, 436, 437, 438, 440, 444, 445, 446; 294/58; 280/47.31, 288.4, 47.3, 47.315; 81/177.2, 177.7; 56/239
See application file for complete search history.

(56) References Cited

U.S. PATENT DOCUMENTS

| | | | | |
|---|---|---|---|---|
| 575,787 | A * | 1/1897 | Voitek | 280/304.1 |
| 1,943,585 | A * | 1/1934 | Cummins et al. | 220/759 |
| 3,814,419 | A * | 6/1974 | Bjorklund et al. | 482/124 |
| 3,882,569 | A * | 5/1975 | Vanderveer | 16/427 |
| 5,163,339 | A * | 11/1992 | Giard et al. | 74/551.3 |
| 5,455,981 | A * | 10/1995 | Wiese | 15/236.01 |
| 5,661,960 | A * | 9/1997 | Smith et al. | 56/12.7 |
| 5,687,556 | A * | 11/1997 | Lintz | 56/400.01 |
| 5,794,307 | A | 8/1998 | Overcash | |
| 5,810,375 | A | 9/1998 | Hoffarth | |
| 5,863,084 | A * | 1/1999 | Krug | 294/59 |
| 6,049,947 | A * | 4/2000 | Lu | 16/422 |
| 6,237,471 | B1 * | 5/2001 | Nam | 99/422 |
| 6,298,775 | B1 * | 10/2001 | Chen | 99/422 |
| 6,324,728 | B1 * | 12/2001 | Blankenheim | 16/431 |
| 6,550,104 | B2 | 4/2003 | Cacciacarne | |
| 7,093,667 | B2 * | 8/2006 | Hurt | 172/381 |
| 7,213,658 | B2 * | 5/2007 | Hurt | 172/381 |
| D547,627 | S * | 7/2007 | Meads | D8/45 |
| 2004/0041361 | A1 * | 3/2004 | Lim | 280/47.31 |

* cited by examiner

*Primary Examiner*—Victor Batson
*Assistant Examiner*—Jeffrey O'Brien (57) ABSTRACT

An arm-supporting apparatus, for assisting a user to transport an existing object between remote locations, includes a spring member having a unitary and single body. The assembly includes a brace which has solid top and bottom surfaces. The brace includes a bracket section statically attached to a brace portion of the existing object and the spring member in such a manner that the spring member remains anchored to the bracket section during operating conditions. The bracket section includes an elongated base plate which has an arcuate shape conforming to a contour of the existing handle. The assembly further includes a plurality of fastening assemblies penetrated through the top and base plates as well as the existing handle for statically mating the bracket section to a curvature of the existing handle while allowing the U-shaped proximal segment to resiliently oscillate along the arcuate path.

14 Claims, 6 Drawing Sheets

ATTACHMENT BRACE FOR SUPPORTING A USER'S ARMS WHEN TRANSPORTING AN OBJECT AND ASSOCIATED METHOD

CROSS REFERENCE TO RELATED APPLICATIONS

This application is a continuation-in-part of U.S. application Ser. No. 12/009,385, filed Jan. 22, 2008, which claims the benefit of U.S. Provisional Application No. 60/804,007, filed Jun. 6, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an arm support apparatus and, more particularly, to an auxiliary brace attachment for providing a user with increased support and comfort, and improved stability while handling a wheelbarrow, a shovel and other brace-operable equipment.

2. Prior Art

Whether you're building something, erecting a brick wall, or just doing general garden cleanup, you need something in which to carry the accumulated goods. For centuries, it's been the wheelbarrow, a one-wheeled, hand-guided cart. Wheelbarrows always look as though they have been around forever. In fact, they have. Records suggest that the first wheeled vehicles, two- and four-wheeled carts pulled by oxen, were made in about 3,500 BC by the Sumerians, who lived in Mesopotamia.

Wheeled technology spread rapidly through much of Europe and Central Asia, reaching China in the middle of the third millennium BC. In return, the Chinese gave us the wheelbarrow. Legend has it that the first wheelbarrow was the brainchild of a Chinese inventor, Ko Yu. However, most sources credit Chuko (Zhuge) Liang (181-234 AD) as the wheelbarrow's true inventor.

Regardless of who invented the device, the wheelbarrow is one of the best labor saving inventions ever developed. The basic concept has remained the same for centuries. It's a simple device that handles outdoor jobs such as moving bricks, dirt, cement, compost, trash, leaves, and other materials. Although wheelbarrows are simple devices, a visit to any hardware store or home and garden center shows that they are available in a wide variety of sizes and shapes. Although there are many types of wheelbarrows, the handles on all models are configured similarly and are grasped and maneuvered in the same way. Sometimes persons find it difficult to bend down in order to lift a wheelbarrow when moving it between remote locations. Obviously, it would be advantageous to provide a means by which lifting and maneuvering a wheelbarrow is easier and less physically demanding.

U.S. Pat. No. 5,794,307 discloses a back saving handle extension for attachment to the straight, shaft-like type of handle typically found on a wheelbarrow which allows a person of taller than average stature to effectively use the wheelbarrow, or similar device, without having to bend over excessively to do so. It is contemplated for a pair of extensions to be employed for most effective use of a device having two handles, with one extension being connected to each handle. Each extension comprises an arcuate tubular member having a flexible hand grip attached to its distal end and connection means securely attaching its other end to the distal end of a straight wheelbarrow-type of handle. For use of a wheelbarrow by only people of taller than average stature, extension may be positioned in a vertical orientation with its hand grip substantially above its arcuate member. Unfortunately, this prior art example does not eliminate the uncomfortable stress that a wheelbarrow handle can have on a user's hands.

U.S. Pat. No. 5,810,375 to Hoffarth discloses a wheelbarrow handle including a closed loop hand-grip. The hand-grip can be an integral portion of the handle, or retrofit to existing wheelbarrow handles by a mounting mechanism. Unfortunately, this prior art example does not provide an adequate amount of stability in the handle which would make the wheelbarrow safer and easier to use.

U.S. Pat. No. 6,550,104 to Cacciacarne discloses a wheelbarrow handle adapter which has an adapter handle with a proximal end and a distal end with an approximate right angle bends therebetween. The adapter handle at the proximal end is attachable to a wheelbarrow handle. In one configuration a sleeve is inserted onto the end of the wheelbarrow handle and a handle bolt is inserted through the adapter handle intermediate the distal end and the proximal end to threadably engage the sleeve. In an alternate configuration the adapter handle having a tubular opening at the distal end is curved sufficiently at the distal end to insert the tubular opening onto the end of the wheelbarrow handle. Unfortunately, this prior art example does not provide an adequate amount of stability in the handle use which would make the wheelbarrow safer and easier to use.

Accordingly, a need remains for an auxiliary wheelbarrow brace attachment in order to overcome the above-noted shortcomings. The present invention satisfies such a need by providing an auxiliary brace attachment that is convenient and easy to use, is durable in design, and effectively eliminates the physical strain associated with lifting a wheelbarrow from a resting position. Such an apparatus advantageously increases safety and stability while also improving efficiency and productivity when moving existing weight and volume capacities using a wheelbarrow. The attachment effectively supports and stabilizes the wrist, joint and forearm of the operator, thus decreasing the mechanical disadvantage associated with lifting wheelbarrow braces, and optimizing the efficiency of energy exerted when moving a load.

BRIEF SUMMARY OF THE INVENTION

In view of the foregoing background, it is therefore an object of the present invention to provide an apparatus for assisting a user with increased support and comfort, and improved stability while operating a hand-implemented object. These and other objects, features, and advantages of the invention are provided by an auxiliary brace attachment.

In a preferred embodiment of the present invention, an arm-supporting apparatus, for assisting a user to transport an existing object between remote locations, includes a spring member having a unitary and single body. Such a spring member effectively includes a plurality of coils wherein each of the coils is synchronously adapted about the fulcrum axis, the fulcrum axis is oriented orthogonal to a longitudinal length of the rectilinear segments and is resiliently adaptable along an arcuate path. The spring member further includes a plurality of non-resilient rectilinear segments oriented parallel to each other and disposed along the top surface of the existing handle, each of the rectilinear segments has axially opposed proximal and distal ends mated with the coils and intercalated within the bracket section respectively. The spring member further includes, a substantially U-shaped proximal segment attached to the coils respectively and is angularly offset along first and second planes extending upwardly and rearwardly away from a horizontal plane of the rectilinear segments respectively.

The assembly further includes a brace which has solid top and bottom surfaces. Such a brace is conveniently attached to a proximal end of the spring member and is proximally offset from a fulcrum axis of the coils wherein the brace extends proximally away from the U-shaped proximal segment. The brace has a first planar section and a second planar section angularly offset therefrom for engaging the user forearm therebeneath.

The assembly further includes, a bracket section statically attached to a brace portion of the existing object and the spring member in such a manner that the spring member remains anchored to the bracket section during operating conditions. Such a spring member advantageously extends rearwardly beyond a proximal end of the brace portion such that a user arm is abutted against a bottom surface of the brace. The brace and the spring member are resiliently urged along the arcuate path when transporting the existing object. The bracket section includes an elongated base plate which has an arcuate shape conforming to a contour of the existing handle. Such a base plate is directly seated on the existing handle maintaining a fixed relationship therewith.

The base plate includes a plurality of ribbed protrusions extending upwardly therefrom and juxtaposed along opposed longitudinal edges of the base plate respectively, the rectilinear proximal segments of the spring member is directly abutted against and disposed inwardly from the ribbed protrusion respectively. The ribbed protrusions are effectively positioned medially with a top plate and hidden therebeneath when the top plate is positioned over the base plate for prohibiting the ribbed protrusions from laterally flexing away from the rectilinear proximal segments respectively. Such an elongated top plate is directly seated over the base plate in such a manner that the rectilinear segments are securely intercalated between the base and top plates, the rectilinear segments maintain a uniform spatial distance therebetween that is less than a width of the existing handle.

The assembly further includes a plurality of fastening assemblies penetrated through the top and base plates as well as the existing handle for statically mating the bracket section to a curvature of the existing handle while conveniently allowing the U-shaped proximal segment to resiliently oscillate along the arcuate path. Each of the fastening assemblies includes a tubular female member which has a threaded inner surface and a shoulder extending outwardly from a bottom end thereof. Such a female member is penetrated upwardly from a bottom of the existing handle and terminating at the base plate. Further, a solid male member has a threaded outer surface rotatably interfitted within the female member, the male and female members are axially aligned along a vertical axis registered orthogonal to the fulcrum axis. Such a male member passes downwardly through the top and base plates and terminates within the female member such that the top and base plates as well as the existing handle are sandwiched between a top shoulder of the male member and the female member shoulder respectively.

A method for assisting a user to transport an existing object between remote locations, the method including the steps of: providing a spring member which has a unitary and single body, the spring member including a plurality of coils and is resiliently adaptable along an arcuate path; providing a brace which has solid top and bottom surfaces; attaching the brace to a proximal end of the spring member such that the brace is proximally offset from a fulcrum axis of the coils; providing and statically attaching a bracket section to a brace portion of the existing object and the spring member in such a manner that the spring member remains anchored to the bracket section during operating conditions; extending the spring member rearwardly beyond a proximal end of the brace portion; the user grapping the existing handle in such a manner that an arm of the user abuts against a bottom surface of the brace; and resiliently urging the brace and the spring member along the arcuate path when transporting the existing object.

The method further includes the steps of: providing and orienting a plurality of non-resilient rectilinear segments parallel to each other; disposing the rectilinear segments along a top surface of the existing handle, each of the rectilinear segments having proximal ends mated with the coils; intercalated distal ends of rectilinear segments with the bracket section respectively; providing and attaching a substantially U-shaped proximal segment to the coils respectively; and angularly offsetting the U-shaped proximal segment along first and second planes extending upwardly and rearwardly away from a horizontal plane of the rectilinear segments respectively.

The method further includes the steps of: synchronously adapting each of the coils about the fulcrum axis, the fulcrum axis is oriented orthogonal to a longitudinal length of the rectilinear segments.

The method further includes the steps of: providing an elongated base plate which has an arcuate shape conforming to a contour of the existing handle; directly seating the base plate on the existing handle and maintaining a fixed relationship therewith; providing and directly seating an elongated top plate over the base plate; securely intercalating the rectilinear segments between the base and top plates; the rectilinear segments maintaining a uniform spatial distance therebetween that is less that a width of the existing handle; and providing and penetrating a plurality of fastening assemblies through top and base plates as well as the existing handle; statically mating the bracket section to a curvature of the existing handle; and allowing the U-shaped proximal segment to resiliently oscillate along the arcuate path.

The method further includes the steps of providing a tubular female member which has a threaded inner surface and a shoulder extending outwardly from a bottom end thereof; upwardly penetrating the female member from a bottom of the existing handle such that the female member terminates at the base plate; providing a solid male member having a threaded outer surface; rotatably interfitting the male member within the female member such that the male and female members are axially aligned along a vertical axis registered orthogonal to the fulcrum axis; downwardly passing the male member through the top and base plates such that the male member terminates within the female member; and sandwiching the top and base plates as well as the existing handle between a top shoulder of the male member and the female member shoulder respectively.

The method further includes the steps of: providing a plurality of ribbed protrusions extending upwardly from the base plate wherein the ribbed protrusions are juxtaposed along opposed longitudinal edges of the base plate respectively; directly abutting the rectilinear proximal segments of the spring member directly against the ribbed protrusions by disposing the rectilinear proximal segments inwardly from the ribbed protrusions respectively; positioning the ribbed protrusions medially of the top plate by hiding the ribbed protrusions therebeneath when the top plate is positioned over the base plate; and prohibiting the ribbed protrusions from laterally flexing away from the rectilinear proximal segments respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-10 by the reference numeral 10 and is intended to provide an auxiliary brace attachment 20 for providing additional leverage and support when using a hand-operable implement, transport dolly, etc. It should be understood that the apparatus 10 may be used to assist with the lifting of many different types of implements, transport dollies, etc. and should not be limited by the exemplary environments shown herein.

Referring initially to FIGS. 1-10, an arm-supporting apparatus 10, for assisting a user to transport an existing object between remote locations, includes a spring member 21 having a unitary and single body. Such a spring member 21 includes a plurality of coils 22 wherein each of the coils 22 is synchronously adapted about the fulcrum axis 23. The fulcrum axis 23 is oriented orthogonal to a longitudinal length of the rectilinear segments and is resiliently adaptable along an arcuate path 24.

The spring member 21 further includes a plurality of non-resilient rectilinear segments 25 oriented parallel to each other and disposed along the top surface of the existing handle 11. Each of the rectilinear segments 25 has axially opposed proximal and distal ends mated with the coils 22 and intercalated within the bracket section 26 respectively. The spring member 21 further includes, a substantially U-shaped proximal segment 27 attached to the coils 22 respectively and is angularly offset along first and second planes extending upwardly and rearwardly away from a horizontal plane of the rectilinear segments 25 respectively. Such an angularly offset configuration advantageously allows a user to grip the brace while standing up and squatting during operating conditions.

The assembly further includes a brace 28 which has solid top and bottom surfaces 45, 46. Such a brace 28 is attached to a proximal end of the spring member 21 and is proximally offset from a fulcrum axis 23 of the coils 22 wherein the brace 28 extends proximally away from the U-shaped proximal segment 27. The brace 28 has a first planar section 50 and a second planar section 51 angularly offset therefrom for engaging the user forearm therebeneath. Such planar sections 50, 51 may be modified to conform with a contoured hand, wrist and forearm of the user.

Figure 1:
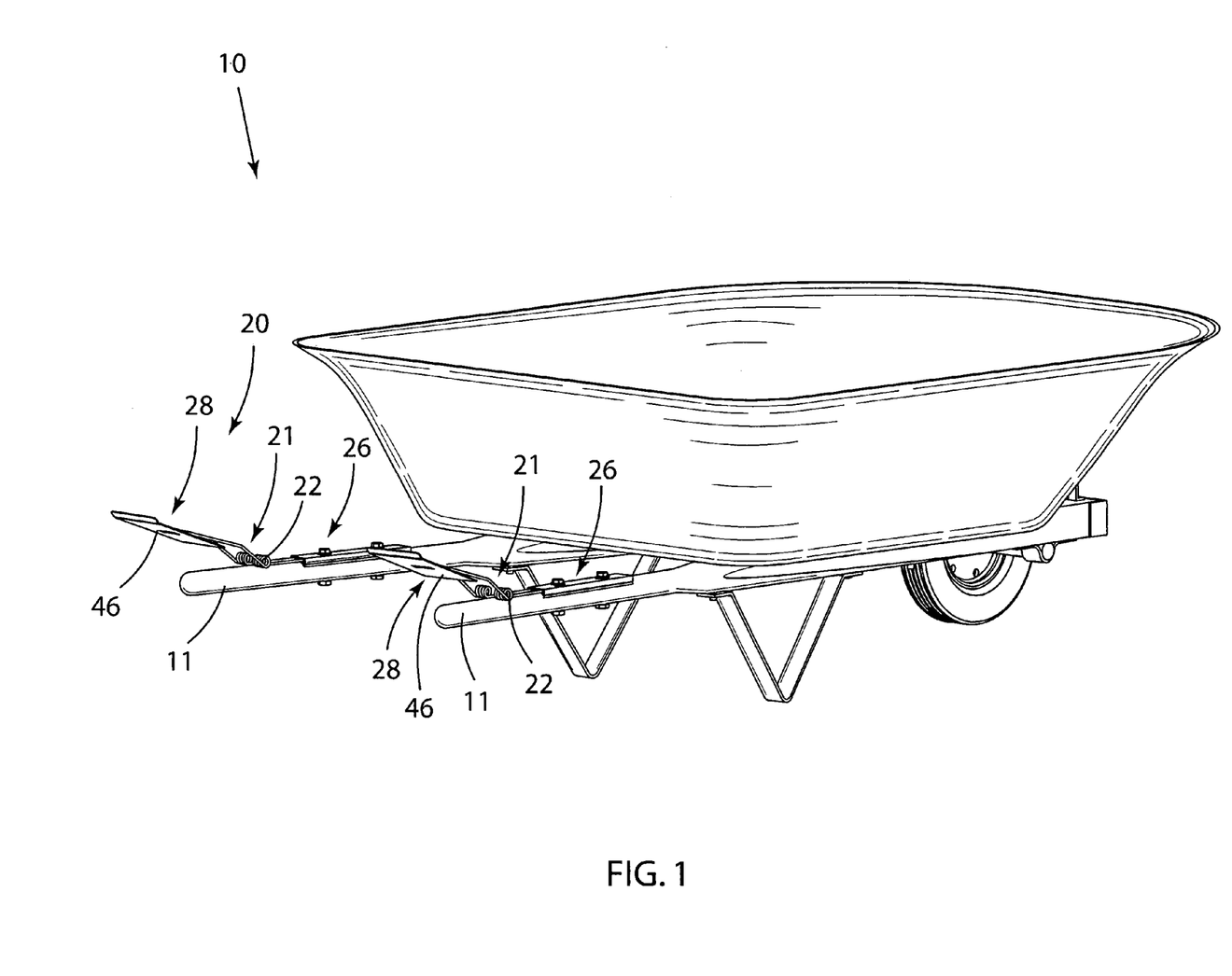
FIG. 1 is a perspective view showing the present invention in a preferred environment.
Figure 2:
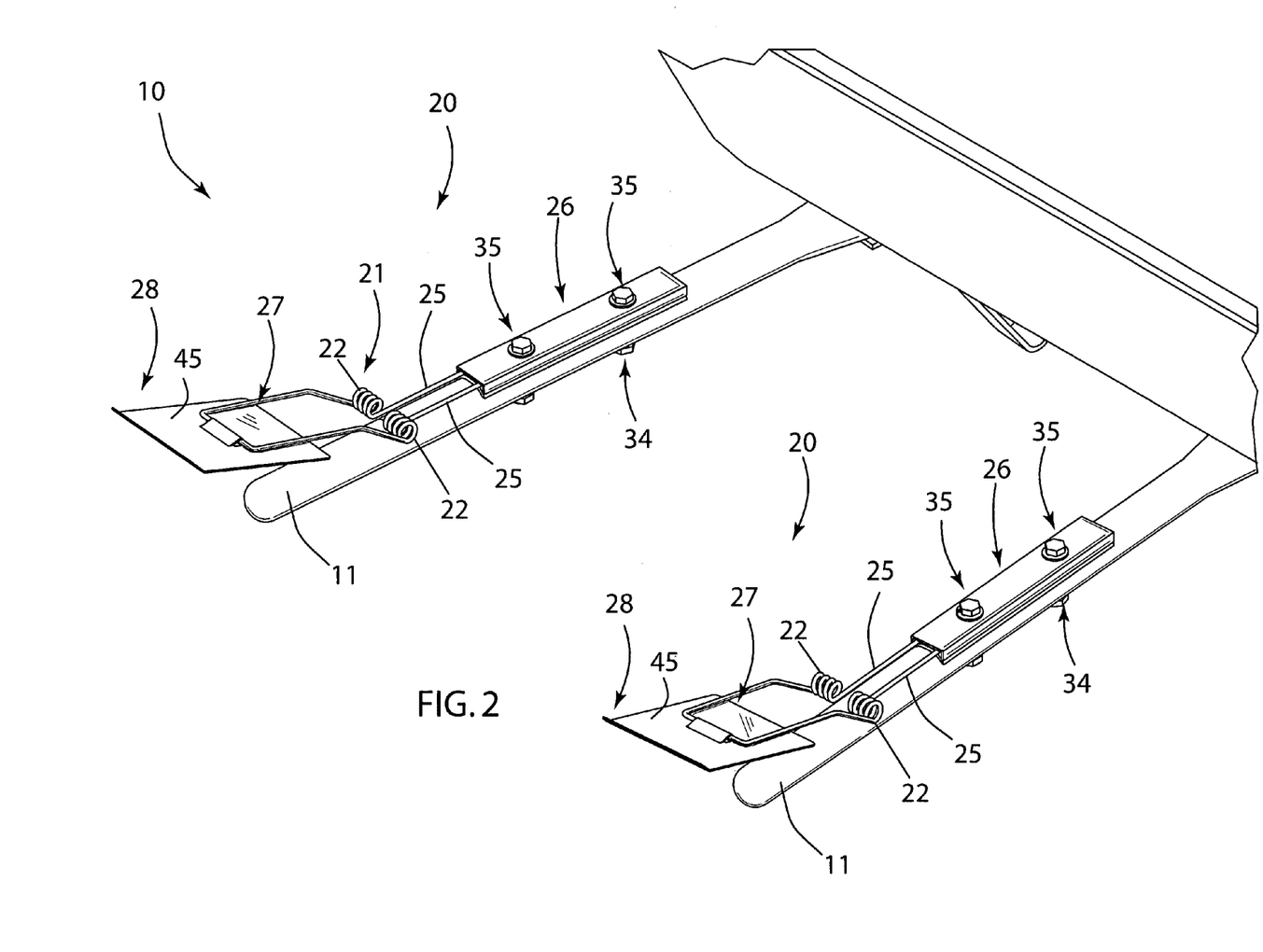
FIG. 2 is an enlarged perspective view of the invention shown in FIG. 1.
Figure 3:
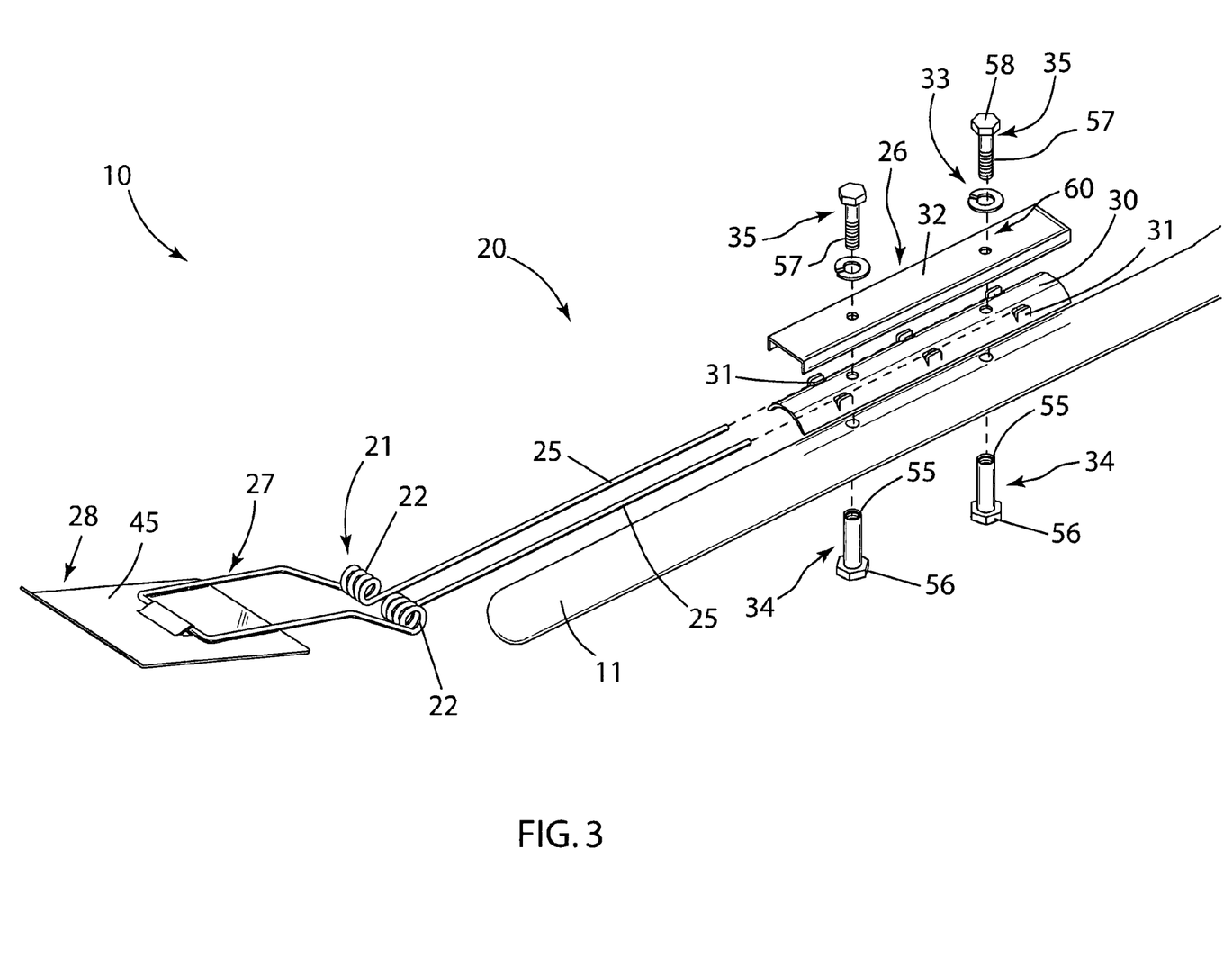
FIG. 3 is an exploded view of the invention shown in FIG. 1.
Figures 4, 5, 6:
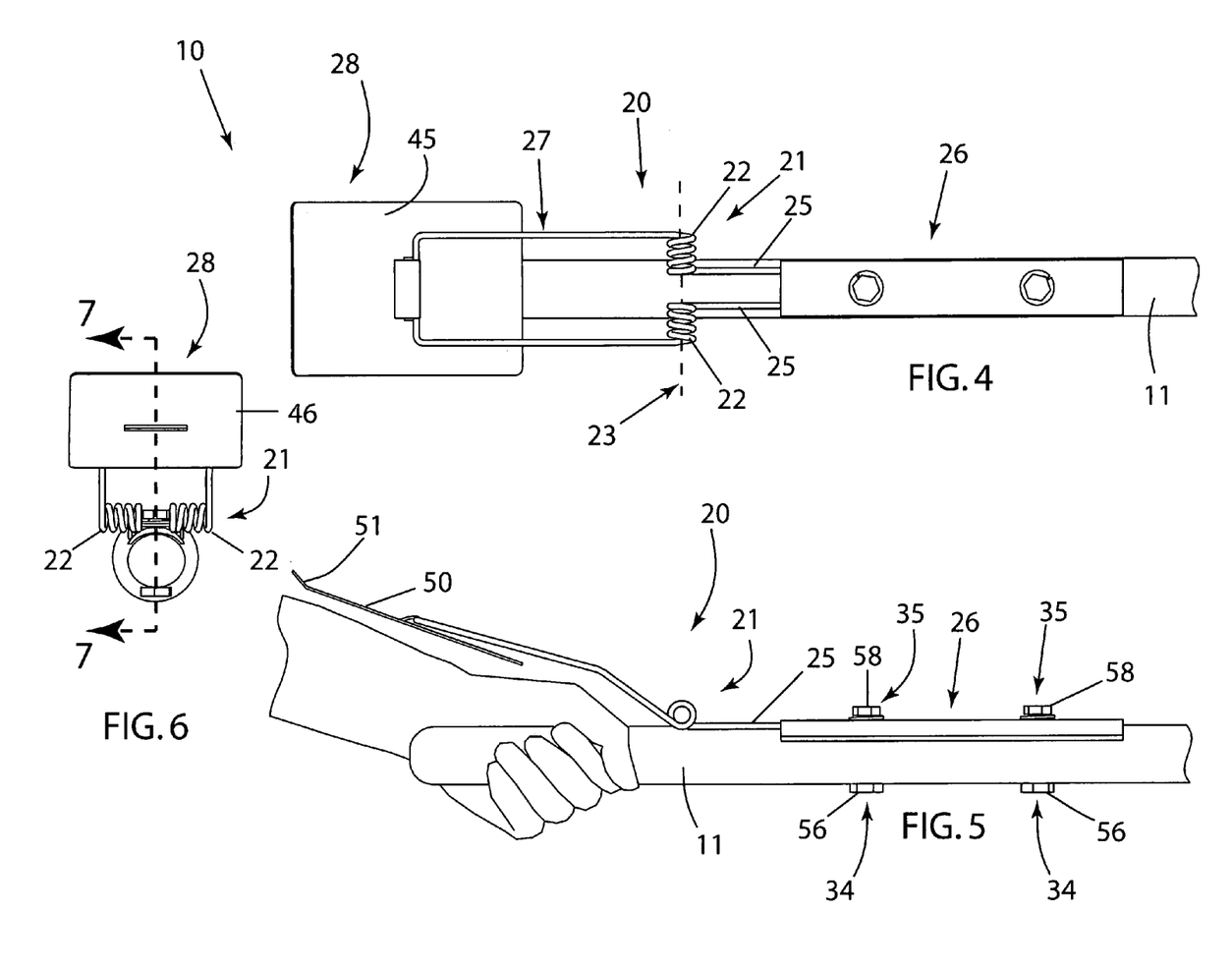
FIG. 4 is a top plan view of the present invention shown in FIG. 1.
FIG. 5 is a side elevational view of the present invention shown in FIG. 1.
FIG. 6 is a front elevational view of the present invention shown in FIG. 1.
Figure 7:
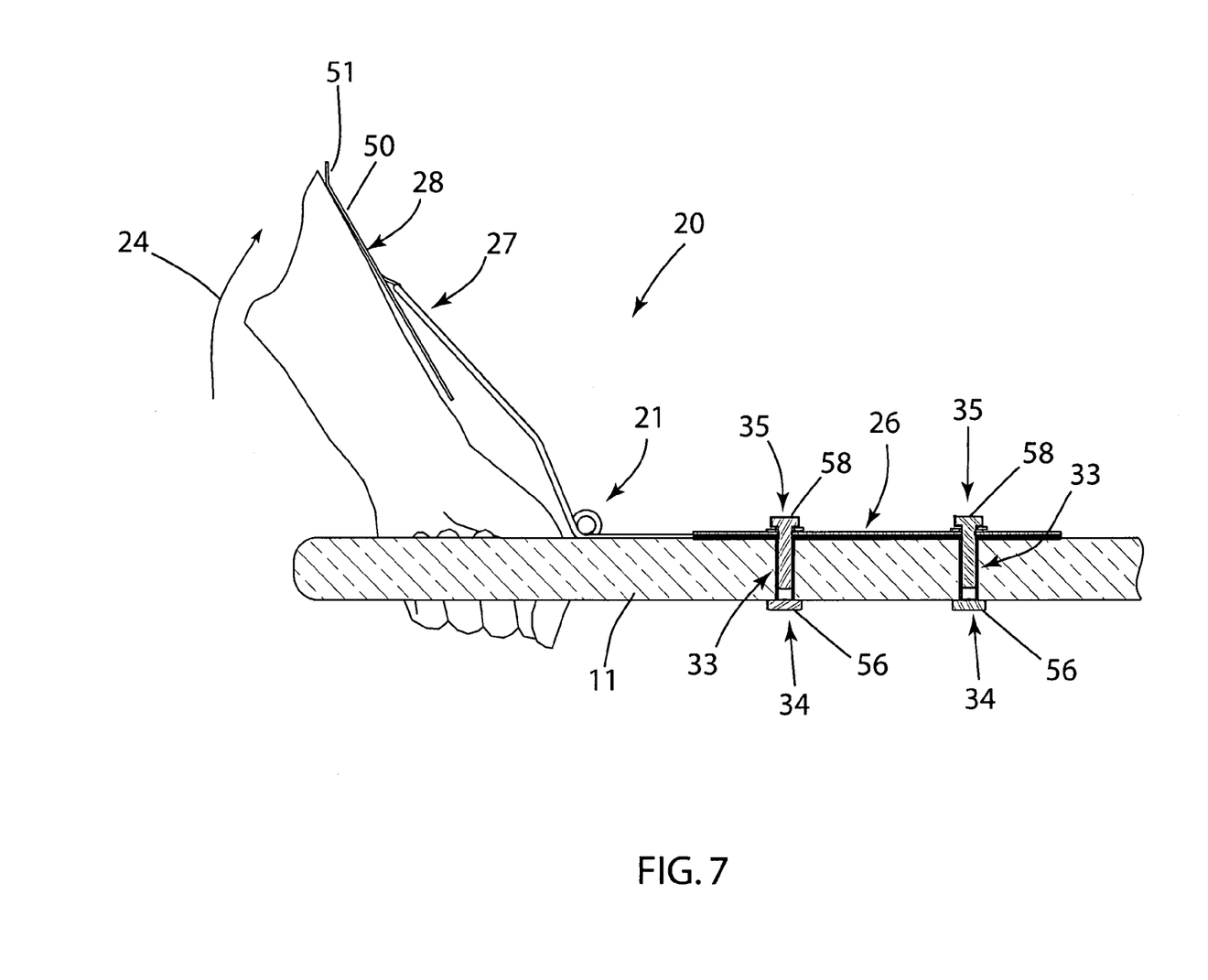
FIG. 7 is a cross-sectional view showing the spring member and brace pivoted along the arcuate path.
Figures 8, 9, 10:
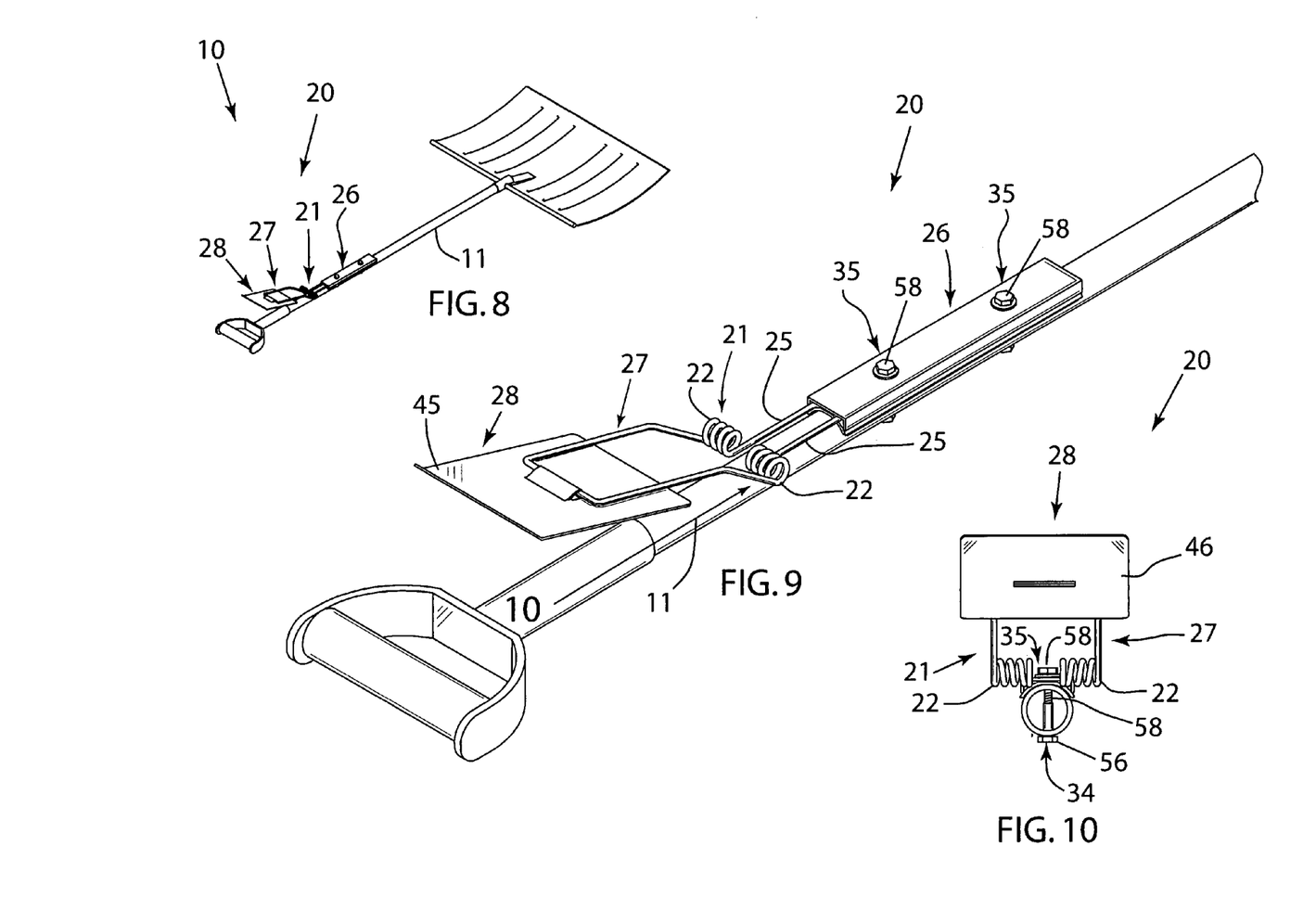
FIG. 8 is a perspective view showing the present invention in an alternate environment.
FIG. 9 is an enlarged perspective view of the invention shown in FIG. 8.
FIG. 10 is a front elevational view of the invention shown in FIG. 8.

Referring to FIGS. 2, 3 and 7, the assembly 10 further includes a bracket section 26 statically attached to a brace portion 11 of the existing object and the spring member 21 in such a manner that the spring member 21 remains anchored to the bracket section 26 during operating conditions. Such a spring member 21 extends rearwardly beyond a proximal end of the brace portion 11 such that a user arm is abutted against a bottom surface 46 of the brace 28. The brace 28 and the spring member 21 are resiliently urged along the arcuate path 24 when transporting the existing object. Of course, the spring member can be tensioned at alternate resiliencies to accommodate lifting and transporting heavy objects. The bracket section 26 includes an elongated base plate 30 which has an arcuate shape conforming to a contour of the existing handle 11. Such a base plate 30 is directly, without the use of intervening elements, seated on the existing handle 11 maintaining a fixed relationship therewith.

The base plate 30 includes a plurality of ribbed protrusions 31 extending upwardly therefrom and juxtaposed along opposed longitudinal edges of the base plate 30 respectively, the rectilinear proximal segments 25 of the spring member 21 is directly, without the use of intervening elements, abutted against and disposed inwardly from the ribbed protrusion 31 respectively. The ribbed protrusions 31 are positioned medially with a top plate 32 and hidden therebeneath when the top plate 32 is positioned over the base plate 30 for prohibiting the ribbed protrusions 31 from laterally flexing away from the rectilinear proximal segments 25 respectively. Such an elongated top plate 32 is directly, without the use of intervening elements, seated over the base plate 30 in such a manner that the rectilinear segments 25 are securely intercalated between the base 30 and top plates 32. The rectilinear segments 25 maintain a uniform spatial distance therebetween that is less than a width of the existing handle 11 and thereby ensure that the spring member 21 is not offset from a top surface of the brace during transport.

Referring to FIGS. 3 and 7, the assembly further includes a plurality of fastening assemblies 33 penetrated through the top 32 and base plates 30 as well as the existing handle 11 for statically mating the bracket section 29 to a curvature of the existing handle 11 while allowing the U-shaped proximal segment 27 to resiliently oscillate along the arcuate path 24. Each of the fastening assemblies 33 includes a tubular female member 34 which has a threaded inner surface 55 and a shoulder 56 extending outwardly from a bottom end thereof. Such a female member 34 is penetrated upwardly from a bottom of the existing handle 11 and terminates at the base plate 30.

Further, a solid male member 35 has a threaded outer surface 57 rotatably interfitted within the female member 34. The male and female members 35, 34 are axially aligned along a vertical axis 60 registered orthogonal to the fulcrum axis 23. Such a male member 35 passes downwardly through the top and base plates 32, 30 and terminates within the female member 34 such that the top and base plates 32, 30 as well as the existing handle 11 are sandwiched between a top shoulder 58 of the male member 35 and the female member 34 shoulder 56 respectively. The combination of such claimed elements provides an unpredictable and unexpected result which is not rendered obvious by one skilled in the art because conventional fastening assemblies 33 are not configured in the manner present in the claimed invention.

Referring to the figures in general, the auxiliary wheelbarrow brace attachment 10 may, in a preferred embodiment, include a sturdy, plastic extension arm 20 that is directly fitted, without the use of intervening elements, over the existing handles 11 of a wheelbarrow. Such an extension arm 20 may, in a preferred embodiment be produced from polyvinyl chloride (PVC). Of course, the apparatus 10 may be produced from a variety other of suitable materials, as is obvious to a person in ordinary skill in the art. Furthermore, of course, the apparatus 10 may be adapted for use with the handles 11 of other commonly used equipment, as is obvious to a person of ordinary skill in the art.

The present invention, as claimed, provides the unexpected and unpredictable benefit of providing an auxiliary brace attachment 20 that is convenient and easy to use, is durable in design, and effectively eliminates the physical strain associated with lifting a wheelbarrow, or other object, from a resting position or during transport. Such an apparatus 10 advantageously increases safety and stability while also improving efficiency and productivity when moving existing weight and volume capacities using a wheelbarrow. The attachment 20 effectively supports and stabilizes the wrist joint and forearm of the operator, thus decreasing the mechanical disadvantage associated with lifting wheelbarrow handles 11, and optimizing the efficiency of energy exerted when moving a load.

In use, a method for assisting a user to transport an existing object between remote locations, the method including the steps of: providing a spring member 21 which has a unitary and single body, the spring member 21 including a plurality of coils 22 and is resiliently adaptable along an arcuate path 24; providing a brace 28 which has solid top and bottom surfaces; attaching the brace to a proximal end of the spring member 21 such that the brace 28 is proximally offset from a fulcrum axis 23 of the coils 22; providing and statically attaching a bracket section 26 to a handle portion 11 of the existing object and the spring member 21 in such a manner that the spring member 21 remains anchored to the bracket section 26 during operating conditions; extending the spring member 21 rearwardly beyond a proximal end of the handle portion 11; the user grapping the existing handle 11 in such a manner that an arm of the user abuts against a bottom surface 46 of the brace 28; and resiliently urging the brace 28 and the spring member 21 along the arcuate path 24 when transporting the existing object.

In use, the method further includes the steps of: providing and orienting a plurality of non-resilient rectilinear segments 25 parallel to each other; disposing the rectilinear segments 25 along a top surface of the existing handle 11, each of the rectilinear segments 25 having proximal ends mated with the coils 22; intercalated distal ends of rectilinear segments 25 with the bracket section 29 respectively; providing and attaching a substantially U-shaped proximal segment 27 to the coils 22 respectively; and angularly offsetting the U-shaped proximal segment 27 along first and second planes 50, 51 extending upwardly and rearwardly away from a horizontal plane of the rectilinear segments 25 respectively.

In use, the method further includes the steps of: synchronously adapting each of the coils 22 about the fulcrum axis 23, the fulcrum axis 23 is oriented orthogonal to a longitudinal length of the rectilinear segments 25.

In use, the method further includes the steps of: providing an elongated base plate 30 which has an arcuate shape conforming to a contour of the existing handle 11; directly seating the base plate 30 on the existing handle 11 and maintaining a fixed relationship therewith; providing and directly seating an elongated top plate 32 over the base plate 30; securely intercalating the rectilinear segments 25 between the base and top plates 30, 32; the rectilinear segments 25 maintaining a uniform spatial distance therebetween that is less that a width of the existing handle 11; and providing and penetrating a plurality of fastening assemblies 33 through top and base plates 32, 30 as well as the existing handle 11; statically mating the bracket section 26 to a curvature of the existing handle 11; and allowing the U-shaped proximal segment 27 to resiliently oscillate along the arcuate path 24.

In use, the method further includes the steps of providing a tubular female member 34 which has a threaded inner surface 55 and a shoulder 56 extending outwardly from a bottom end thereof; upwardly penetrating the female member 34 from a bottom of the existing handle 11 such that the female member 34 terminates at the base plate 30; providing a solid male member 35 having a threaded outer surface 57; rotatably interfitting the male member 35 within the female member 34 such that the male and female members 35, 34 are axially aligned along a vertical axis 60 registered orthogonal to the fulcrum axis 23; downwardly passing the male member 35 through the top and base plates 32, 30 such that the male member 35 terminates within the female member 34; and sandwiching the top and base plates 30, 32 as well as the existing handle 11 between a top shoulder 58 of the male member 35 and the female member 34 shoulder 56 respectively.

In use, the method further includes the steps of: providing a plurality of ribbed protrusions 31 extending upwardly from the base plate 30 wherein the ribbed protrusions 31 are juxtaposed along opposed longitudinal edges of the base plate 30 respectively; directly abutting the rectilinear proximal segments 25 of the spring member 21 directly against the ribbed protrusions 31 by disposing the rectilinear proximal segments 25 inwardly from the ribbed protrusions 31 respectively; positioning the ribbed protrusions 31 medially of the top plate 32 by hiding the ribbed protrusions 31 therebeneath when the top plate 32 is positioned over the base plate 30; and prohibiting the ribbed protrusions 31 from laterally flexing away from the rectilinear proximal segments 25 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An arm-supporting apparatus for assisting a user to transport an existing object between remote locations, said arm-supporting apparatus comprising:
   an existing handle;
   a spring member comprising a plurality of coils and being resiliently adaptable along an arcuate path;
   a brace attached to a proximal end of said spring member and being proximally offset from a fulcrum axis of said coils; and
   a bracket section statically attached to a brace portion of the existing object and said spring member in such a manner that said spring member remains anchored to said bracket section during operating conditions, said spring member extending rearwardly beyond a proximal end of the brace portion such that a user arm is abutted against a bottom surface of said brace, said brace and said spring member being resiliently urged along said arcuate path when transporting the existing object;
   wherein said spring member further comprises:
   a plurality of non-resilient rectilinear segments oriented parallel to each other and disposed along a top surface of the existing handle, each of said rectilinear segments having axially opposed proximal and distal ends mated with said coils and intercalated within said bracket section respectively; and
   a substantially U-shaped proximal segment attached to said coils respectively and being angularly offset along first and second planes extending upwardly and rearwardly away from a horizontal plane of said rectilinear segments respectively;
   wherein said bracket section comprises:
   an elongated base plate having an arcuate shape conforming to a contour of the existing handle, said base plate being directly seated on the existing handle and maintaining a fixed relationship therewith;
   an elongated top plate directly seated over said base plate in such a manner that said rectilinear segments are securely intercalated between said base and top plates, said rectilinear segments maintaining a uniform spatial distance therebetween that is less than a width of the existing handle; and
   a plurality of fastening assemblies penetrated through said top and base plates as well as the existing handle for statically mating said bracket section to a curvature of the existing handle while allowing said U-shaped proximal segment to resiliently oscillate along said arcuate path.

2. The arm-supporting apparatus of claim 1, wherein said brace extends proximally away from said U-shaped proximal segment, said brace having a first planar section and a second planar section angularly offset therefrom for engaging the user forearm therebeneath.

3. The arm-supporting apparatus of claim 1, wherein each of said coils are synchronously adapted about said fulcrum axis, said fulcrum axis being oriented orthogonal to a longitudinal length of said rectilinear segments.

4. The arm-supporting apparatus of claim 1, wherein each of said fastening assemblies comprises:
   a tubular female member having a threaded inner surface and a shoulder extending outwardly from a bottom end thereof, said female member being penetrated upwardly from a bottom of the existing handle and terminating at said base plate; and
   a solid male member having a threaded outer surface rotatably interfitted within said female member, said male and female members being axially aligned along a vertical axis registered orthogonal to said fulcrum axis;
   wherein said male member passes downwardly through said top and base plates and terminates within said female member such that said top and base plates as well as the existing handle are sandwiched between a top shoulder of said male member and said female member shoulder respectively.

5. The arm-supporting apparatus of claim 4, wherein said base plate comprises: a plurality of ribbed protrusions extending upwardly therefrom and juxtaposed along opposed longitudinal edges of said base plate respectively, said rectilinear proximal segments of said spring member being directly abutted against and disposed inwardly from said ribbed protrusion respectively, said ribbed protrusions being positioned medially of said top plate and hidden therebeneath when said top plate is positioned over said base plate for prohibiting said ribbed protrusions from laterally flexing away from said rectilinear proximal segments respectively.

6. An arm-supporting apparatus for assisting a user to transport an existing object between remote locations, said arm-supporting apparatus comprising:
   an existing handle;
   a spring member having a unitary and single body, said spring member comprising a plurality of coils and being resiliently adaptable along an arcuate path;
   a brace having solid top and bottom surfaces, said brace being attached to a proximal end of said spring member and being proximally offset from a fulcrum axis of said coils; and
   a bracket section statically attached to a brace portion of the existing object and said spring member in such a manner that said spring member remains anchored to said bracket section during operating conditions, said spring member extending rearwardly beyond a proximal end of the brace portion such that a user arm is abutted against a bottom surface of said brace, said brace and said spring member being resiliently urged along said arcuate path when transporting the existing object;
   wherein said spring member further comprises:
   a plurality of non-resilient rectilinear segments oriented parallel to each other and disposed along a top surface of the existing handle, each of said rectilinear segments having axially opposed proximal and distal ends mated with said coils and intercalated within said bracket section respectively; and a substantially U-shaped proximal segment attached to said coils respectively and being angularly offset along first and second planes extending upwardly and rearwardly away from a horizontal plane of said rectilinear segments respectively;

wherein said bracket section comprises:

an elongated base plate having an arcuate shape conforming to a contour of the existing handle, said base plate being directly seated on the existing handle and maintaining a fixed relationship therewith;

an elongated top plate directly seated over said base plate in such a manner that said rectilinear segments are securely intercalated between said base and top plates, said rectilinear segments maintaining a uniform spatial distance therebetween that is less than a width of the existing handle; and a plurality of fastening assemblies penetrated through said top and base plates as well as the existing handle for statically mating said bracket section to a curvature of the existing handle while allowing said U-shaped proximal segment to resiliently oscillate along said arcuate path.

7. The arm-supporting apparatus of claim 6, wherein said brace extends proximally away from said U-shaped proximal segment, said brace having a first planar section and a second planar section angularly offset therefrom for engaging the user forearm therebeneath.

8. The arm-supporting apparatus of claim 6, wherein each of said coils are synchronously adapted about said fulcrum axis, said fulcrum axis being oriented orthogonal to a longitudinal length of said rectilinear segments.

9. The arm-supporting apparatus of claim 6, wherein each of said fastening assemblies comprises:

a tubular female member having a threaded inner surface and a shoulder extending outwardly from a bottom end thereof, said female member being penetrated upwardly from a bottom of the existing handle and terminating at said base plate; and a solid male member having a threaded outer surface rotatably interfitted within said female member, said male and female members being axially aligned along a vertical axis registered orthogonal to said fulcrum axis;

wherein said male member passes downwardly through said top and base plates and terminates within said female member such that said top and base plates as well as the existing handle are sandwiched between a top shoulder of said male member and said female member shoulder respectively.

10. The arm-supporting apparatus of claim 9, wherein said base plate comprises: a plurality of ribbed protrusions extending upwardly therefrom and juxtaposed along opposed longitudinal edges of said base plate respectively, said rectilinear proximal segments of said spring member being directly abutted against and disposed inwardly from said ribbed protrusion respectively, said ribbed protrusions being positioned medially of said top plate and hidden therebeneath when said top plate is positioned over said base plate for prohibiting said ribbed protrusions from laterally flexing away from said rectilinear proximal segments respectively.

11. A method for assisting a user to transport an existing object between remote locations, said method comprising the steps of:

a. providing an existing handle b. providing a spring member having a unitary and single body, said spring member comprising a plurality of coils and being resiliently adaptable along an arcuate path;

c. providing a brace having solid top and bottom surfaces;

d. attaching said brace to a proximal end of said spring member such that said brace is proximally offset from a fulcrum axis of said coils;

e. providing and statically attaching a bracket section to a brace portion of the existing object and said spring member in such a manner that said spring member remains anchored to said bracket section during operating conditions;

f. extending said spring member rearwardly beyond a proximal end of the brace portion;

g. the user gripping the existing handle in such a manner that an arm of the user abuts against a bottom surface of said brace; and h. resiliently urging said brace and said spring member along said arcuate path when transporting the existing object;

i. providing and orienting said spring member with a plurality of non-resilient rectilinear segments parallel to each other; disposing said rectilinear segments along a top surface of the existing handle, each of said rectilinear segments having proximal ends mated with said coils; intercalated distal ends of rectilinear segments with said bracket section respectively; providing and attaching a substantially U-shaped proximal segment to said coils respectively; and angularly offsetting said U-shaped proximal segment along first and second planes extending upwardly and rearwardly away from a horizontal plane of said rectilinear segments respectively;

j. providing said bracket section with an elongated base plate having an arcuate shape conforming to a contour of the existing handle; directly seating said base plate on the existing handle and maintaining a fixed relationship therewith; providing and directly seating an elongated top plate over said base plate; securely intercalating said rectilinear segments between said base and top plates; said rectilinear segments maintaining a uniform spatial distance therebetween that is less than a width of the existing handle; and providing and penetrating a plurality of fastening assemblies through said top and base plates as well as the existing handle; statically mating said bracket section to a curvature of the existing handle; and allowing said U-shaped proximal segment to resiliently oscillate along said arcuate path.

12. The method of claim 11, wherein step h. further comprises the steps of: synchronously adapting each of said coils about said fulcrum axis, said fulcrum axis being oriented orthogonal to a longitudinal length of said rectilinear segments.

13. The method of claim 11, further comprising the steps of: providing a tubular female member having a threaded inner surface and a shoulder extending outwardly from a bottom end thereof; upwardly penetrating said female member from a bottom of the existing handle such that said female member terminates at said base plate; providing a solid male member having a threaded outer surface; rotatably interfitting said male member within said female member such that said male and female members are axially aligned along a vertical axis registered orthogonal to said fulcrum axis; downwardly passing said male member through said top and base plates such that said male member terminates within said female member; and sandwiching said top and base plates as well as the existing handle between a top shoulder of said male member and said female member shoulder respectively.

14. The method of claim 13, further comprising the steps of: providing a plurality of ribbed protrusions extending upwardly from said base plate wherein said ribbed protrusions are juxtaposed along opposed longitudinal edges of said base plate respectively; directly abutting said rectilinear proximal segments of said spring member directly against said ribbed protrusions by disposing said rectilinear proximal segments inwardly from said ribbed protrusions respectively; positioning said ribbed protrusions medially of said top plate by hiding said ribbed protrusions therebeneath when said top plate is positioned over said base plate; and prohibiting said ribbed protrusions from laterally flexing away from said rectilinear proximal segments respectively.

* * * * *